(12) United States Patent
Salonaho

(10) Patent No.: US 6,678,531 B1
(45) Date of Patent: Jan. 13, 2004

(54) METHOD AND APPARATUS FOR POWER CONTROL IN A MOBILE TELECOMMUNICATION SYSTEM

(75) Inventor: Oscar Salonaho, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/647,587

(22) PCT Filed: Mar. 29, 1999

(86) PCT No.: PCT/FI99/00257
§ 371 (c)(1),
(2), (4) Date: Oct. 2, 2000

(87) PCT Pub. No.: WO99/52310
PCT Pub. Date: Oct. 14, 1999

(30) Foreign Application Priority Data

Apr. 3, 1998 (FI) .................................................. 980780

(51) Int. Cl.⁷ .............................. H04B 7/00; H04Q 7/20
(52) U.S. Cl. ...................... 455/522; 455/524; 455/525; 455/439; 455/442; 455/437; 455/436
(58) Field of Search ................................ 455/439, 442, 455/436, 437, 69, 438, 522, 524, 525

(56) References Cited

U.S. PATENT DOCUMENTS

| | | | | |
|---|---|---|---|---|
| 5,056,109 A | * | 10/1991 | Gilhousen et al. ............. 375/1 |
| 5,383,219 A | | 1/1995 | Wheatley, III et al. .......... 375/1 |
| 5,485,486 A | * | 1/1996 | Gilhousen et al. ........... 375/205 |
| 5,625,876 A | | 4/1997 | Gilhousen et al. ......... 455/33.3 |
| 5,884,187 A | * | 3/1999 | Ziv et al. .................... 455/522 |
| 5,893,035 A | * | 4/1999 | Chen .......................... 455/522 |
| 5,995,496 A | * | 11/1999 | Honkasalo et al. ......... 370/318 |
| 6,046,990 A | * | 4/2000 | Chennakeshu et al. ..... 370/317 |
| 6,070,058 A | * | 5/2000 | Waldroup et al. ............. 455/69 |
| 6,085,107 A | * | 7/2000 | Persson et al. ............. 455/522 |
| 6,085,108 A | * | 7/2000 | Knutsson et al. ........... 455/522 |

FOREIGN PATENT DOCUMENTS

| | | |
|---|---|---|
| EP | 0 817 400 A2 | 1/1998 |
| EP | 0 856 955 A2 | 1/1998 |
| WO | WO 96/31013 | 10/1996 |
| WO | WO 97/26716 | 7/1997 |
| WO | WO 97/34439 | 9/1997 |
| WO | WO 98/11677 | 3/1998 |
| WO | WO 99/00914 | 1/1999 |

* cited by examiner

Primary Examiner—Vivian Chin
Assistant Examiner—Marceau Milord
(74) Attorney, Agent, or Firm—Harrington & Smith, LLP

(57) ABSTRACT

According to the invention, time is divided into power correction intervals. A target power or a target energy per bit and correction step limits are determined for each base station. The parameters are signalled to the base stations. Each base station subsequently executes a power correction algorithm. Each base station compares the used transmission power or energy per bit to said target power or said target energy per bit, respectively. The result of the comparison is further divided by a predetermined number of power correction steps within said power correction interval, the number preferably equals with the number of repetitions of downlink power control commands within said power correction interval, to provide a power correction step. The power correction is then executed in combination with the downlink closed loop power control.

19 Claims, 5 Drawing Sheets

METHOD AND APPARATUS FOR POWER CONTROL IN A MOBILE TELECOMMUNICATION SYSTEM

FIELD OF THE INVENTION

The present invention relates to a mobile telecommunication system, particularly to a method and system for reducing the average downlink transmitting power from a base station to a mobile station during a soft handover.

BACKGROUND OF THE INVENTION

In a code division multiple access (CDMA) mobile telecommunication system a common frequency band is used for communicating with all base stations. Signals occupying the common frequency band are discriminated at the receiving station by a high speed pseudonoise (PN) code. Transmitter stations using different PN codes or different PN code phases produce signals that can be separately received at the receiving station.

FIG. 1 illustrates the relevant parts of a prior art CDMA mobile telecommunication system. Each base station (10, 11) transmits with a PN spreading code different from the PN spreading code of other base stations. A mobile station 20 is engaged in a conversation through the base station 10. The mobile station 20 is equipped with a receiver that allows it to measure the signal strength, in addition to the base station 10, of a group of other base stations (not shown) including the adjacent base station 11. The mobile station 20 reports the measurements to the network through the base station 10. As the mobile unit is engaged in a conversation through the base station 10 and it moves to a location, where it is able to receive the base station 11 with an adequate signal strength, a simultaneous communication path with the base station 11 is established. The decision is made by the radio network controller 30 controlling both base stations This state is called a soft handover and it is well known in the art. The mobile station is further equipped with a well known RAKE receiver, which enables the mobile station to simultaneously despread and combine the transmissions from base stations 10 and 11. In the exemplary embodiment, for the sake of simplicity, the mobile unit performs a soft handover between two base stations, but in reality more base stations may be involved.

Because CDMA base stations utilise a common frequency band for transmission, each transmitted signal is interfering with other signals. Therefore, an efficient power control for individual base stations and mobile stations is extremely important to attain the maximum capacity. Ideally each mobile should be transmitting at minimum power or at minimum energy per bit still sufficient to achieve a required signal to interference ratio (SIR) at the receiver of the receiving base station. Similarly each base station transmission directed to a specific mobile should be transmitted at minimum power or at minimum energy per bit still sufficient to achieve a required SIR at the receiver of the intended mobile unit. In the soft handover, the transmissions from both base stations directed to a specific mobile should be transmitted with a minimum power still sufficient to achieve a nominal SIR for the combined signal at the receiver of the intended mobile unit. If one base station transmits with higher power than the other, there exists virtually no diversity gain. To maximally benefit from the diversity gain, it is important to ensure that base stations involved in a soft handover transmit with powers is equal as possible. Achieving this helps to minimise the overall downlink transmission power as well.

In prior art mobile telecommunication systems mobile stations are capable of controlling base station transmission power on transmissions directed to them by generating power control commands advising the base station to either increase or decrease the transmission power by a predetermined step. The power control commands are generated responsive to measuring the SIR (or the power) of the received signal and comparing it to a predetermined threshold. The power control commands are subsequently interleaved into the uplink transmission of information. The base station receives the transmission, decodes the power control commands and adjusts it's transmission power accordingly. This is called downlink closed loop power control. The closed loop power control may be executed in either constant or adaptive adjustment steps. One prior art method of adapting closed loop adjustment steps is described in WO 9726716.

There exists a problem in the downlink closed loop power control during a soft handover. Since the same transmission from the mobile station 20 is received at both base stations 10 and 11, both base stations will receive the same power control commands. If the received signal quality at the mobile station 20 is higher than the threshold, the mobile station 20 generates and transmits a power control command advising base stations to decrease their transmission powers. However, at the base stations, the received uplink transmissions may have experienced different attenuations and interferences causing errors at the base station 10 but not at the base station 11. Therefore, a transmission error in a "decrease power" command at the base station 10 would lead to the base station 10 increasing it's power whereas the base station 11 would be decreasing s power as intended. This problem is called power drifting. If no correcting measures are taken, the difference in the transmission powers will last until the completion of the soft handover thus deteriorating the overall system performance.

One prior art solution to this problem is to limit the dynamic range of the downlink transmission powers. This is not a good alternative, since it results in excessive power usage by the base stations thus increasing interference.

Another known solution is to set the base station transmission powers equal at given time intervals. This is rather slow or signalling consuming solution.

Yet another known solution is to generate different power control commands for each base station. This consumes air interface resources and is not applicable in all air interfaces.

SUMMARY OF THE INVENTION

It is therefore an object of the present invention to improve the downlink signal to interference ratio by preventing the base stations involved in a soft handover from transmitting with substantially unequal transmission powers or energies per bit.

It is another object of the present invention to determine power correction parameters: a power correction interval length, a target power level or a target energy per bit level, and correction step size limits; and to signal said parameters to the network element executing a power correction algorithm.

It is another object of the present invention to correct the downlink power of the base stations involved in a soft handover with a power correction algorithm additional to downlink closed loop power control such that in the absence of closed loop power control commands the individual powers or energies per bit of separate base stations all converge to said target powers or said target energies per bit, respectively, at a rate determined by the power correction interval length and/or the correction step size limits.

It is further an object of the present invention to adjust the downlink power of individual base stations during the soft handover in such corrected steps that the possibly initially unequal transmission powers converge upon the execution of downlink closed loop power control.

It is yet another object of the present invention to provide a method to recover from the transmission errors in the downlink power control commands during a soft handover.

According to the invention, time is divided into power correction intervals. A target power or a target energy per bit and correction step limits are determined for each base station. The parameters are signalled to the base stations. Each base station subsequently executes a power correction algorithm. Each base station compares the used transmission power or energy per bit to said target power or said target energy per bit, respectively. The result of the comparison is further divided by a predetermined number of power correction steps within said power correction interval, the number preferably equal with the number of repetitions of downlink power control commands within said power correction interval, to provide a power correction step. The power correction is then executed in combination with the downlink closed loop power control. In the preferred embodiment the closed loop adjustment steps are employed at the same time with the correction steps, effectively resulting corrected closed loop adjustment steps. The corrected closed loop adjustment steps are subsequently used to adjust the transmission power according to the downlink power control commands from the mobile station within the next power correction interval. If the power control command is absent because of a sudden uplink fade, the power correction step is employed alone.

BRIEF DESCRIPTION OF THE FIGURES

The invention is described more closely with reference to the accompanying schematic drawings, in which.

DETAILED DESCRIPTION OF THE INVENTION

Figure 2:
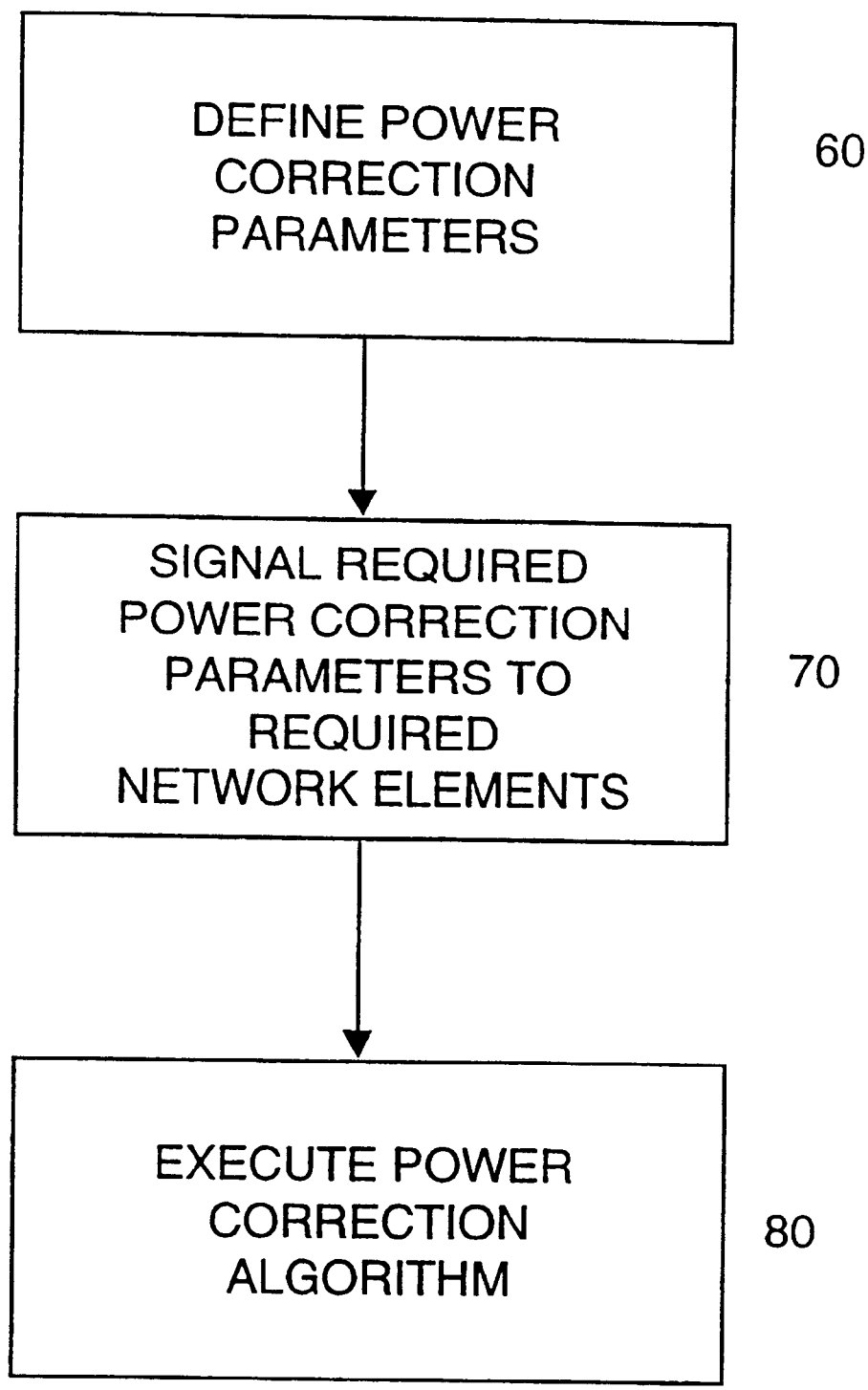
FIG. 2 is the flow chart illustrating the method of the present invention.

The invention is illustrated in FIG. 2. In the initial step 60 the parameters used by the power correction algorithm are determined. The parameters comprise at least: the length of the power correction interval, the correction step size limits and the target power level or the target energy per bit level. In the next step 70, the determined parameters are signalled to the network element or elements executing the correction algorithm. In the last step 80 the power correction algorithm is executed in accordance with the signalled parameters.

Figure 1:
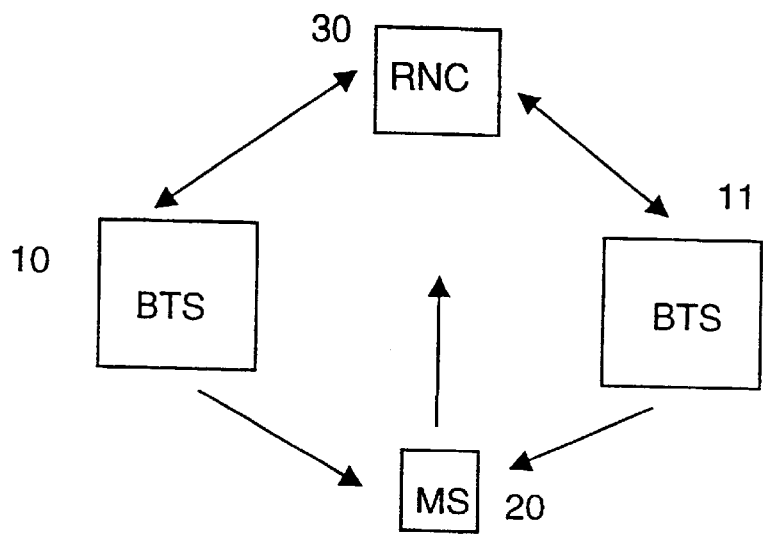
FIG. 1 shows the relevant parts of a prior art CDMA mobile telecommunication system.
Figure 3:
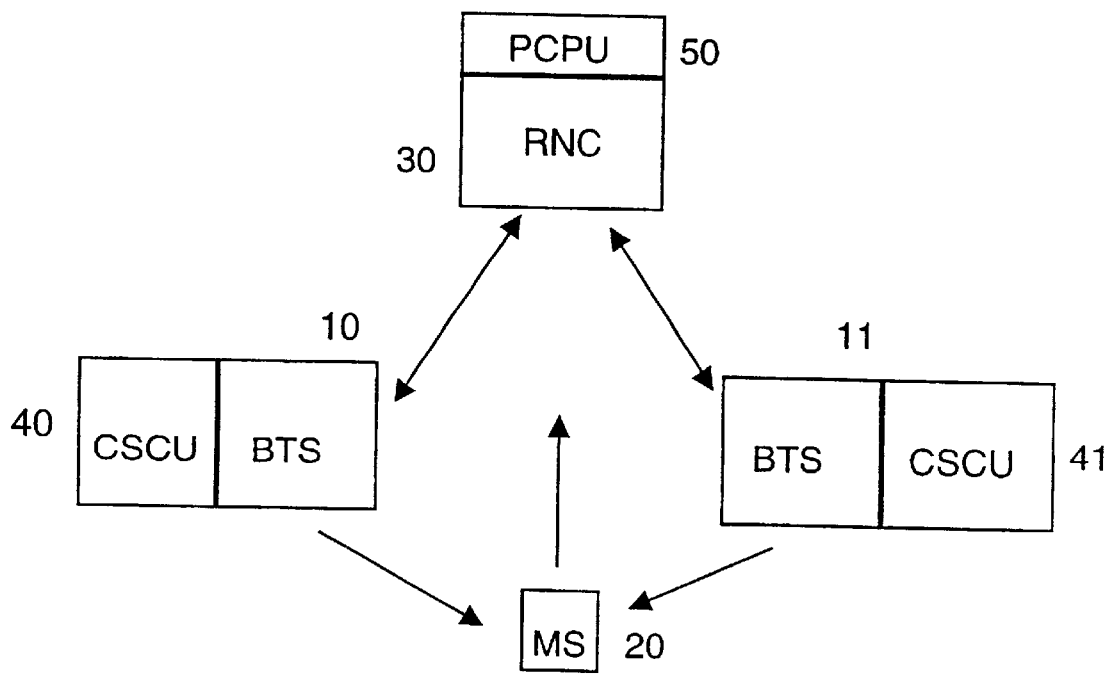
FIG. 3 illustrates the relevant parts of the preferred embodiment of a CDMA mobile telecommunication system according to the present invention.

The new functional elements according to the preferred embodiment of the present invention are illustrated in FIG. 3. In addition to the prior art telecommunication system a centralised Power Control Processing Unit 50 is included. The PCPU 50 is capable of communicating control information with base stations 10 and 11. The PCPU 50 receives mobile station measurements and the used power level or used energy per bit level of the downlink signal from the base stations 10 and 11. Based on the information, the PCPU calculates a target power level or a target energy per bit level for the base stations and signals it to the base stations in an initiation message together with other required parameters. In the preferred embodiment the power correction interval and correction step limits are parameters set by the network operator. In the preferred embodiment the power control processing unit resides in a network element controlling and connected to the base stations. It can be either a mobile switch or a radio network controller, depending on the used network architecture. The centralised power control processing unit may be implemented as a software process in a separate processing unit or in an existing processing unit. In a case when the mobile station is in communication with base stations under the control of separate PCPUs (not shown), one PCPU is nominated as a master PCPU and information indicative of the power correction parameters is signalled from the master PCPU to the second PCPU.

Further additional elements are the correction step calculation units 40 and 41, preferably located at the base stations 10 and 11, respectively. The CSCUs 40 and 41 are arranged to receive the initiation message containing the target power level or the target energy per bit level sent by the PCPU 50 and to calculate the correction step to be used in combination with closed loop adjustment steps when adjusting the base station power levels according to the power control commands. The correction step calculation units may be implemented as a software process in a separate processing unit or in an existing processing unit.

Figure 4:
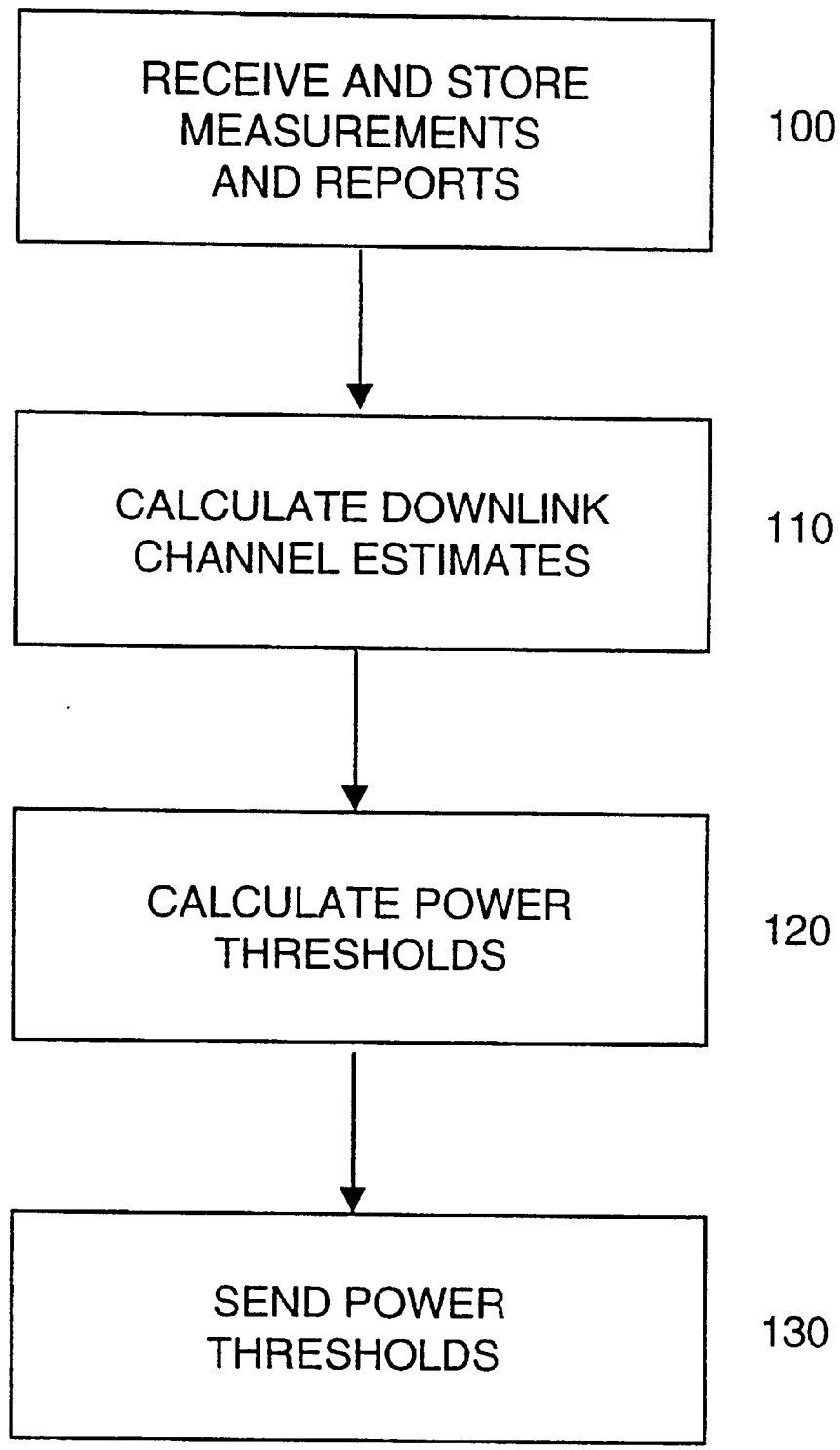
FIG. 4 is the decision flow chart of the Power Control Processing Unit 30.

FIG. 4 shows the decision flow chart of the PCPU 50. In step 100 the PCPU receives and stores the mobile station 20 measurements preferably together with used base station transmission power level or used energy per bit level. Based on the received information, the PCPU calculates estimates for downlink channel attenuation and downlink channel interference in step 110. Once the estimates are calculated, the PCPU moves into step 120 and calculates the target power or the target energy per bit for the individual base stations 10 and 11. Because the methods for actual calculations are well known in the art they are not discussed in greater detail. In the last step 130 the PCPU sends the initiation message containing the calculated target power or target energy per bit to the base stations 10 and 11.

Figure 5:
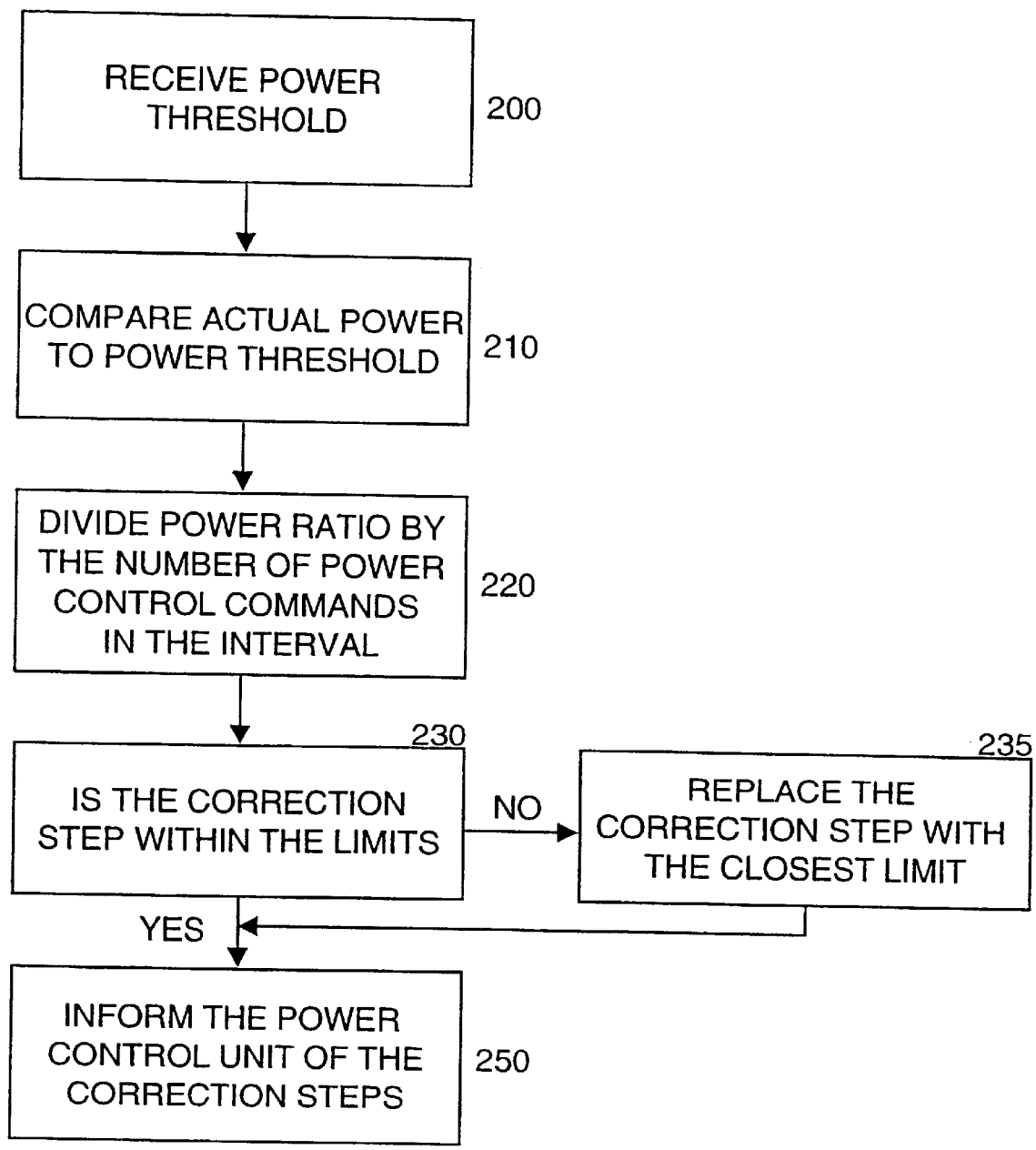
FIG. 5 is the decision flow chart of the Correction step calculation units 40 and 41.

FIG. 5 is an exemplary flow chart of the decision process in the correction step calculation units 40 and 41 of the preferred embodiment. Similar process is executed in both CSCUs, but only the process run in CSCU 40 is described. In the initial step 200 CSCU 40 determines that a new power correction interval has commenced. The commencement is preferably determined by the reception of the initiation message containing the target power or the target energy per bit from PCPU 50. In the preferred embodiment the power correction interval is a parameter set by the network operator, but it may be adjusted adaptively by PCPU 50. If it is adjusted adaptively by the PCPU, the new value is communicated in the initiation message together with the new target power or the target energy per bit. In the preferred embodiment an initiation message is transmitted at each power correction interval. However, it is possible to refrain from transmitting the initiation message if the parameter(s) remain unchanged. In that case the determining of the commencement could be done by utilising an internal timer or a counter exceeding a predetermined threshold. Once CSCU 40 has determined that a new power correction interval has commenced, it moves into step 210 for comparing the used base station transmission power or the used energy per bit to the target power or the target energy per bit, respectively. In the preferred embodiment the result of this comparison is a power ratio or an energy per bit ratio, which is most conveniently expressed in dBs. However, the result may be expressed in some other way as the power difference. After CSCU 40 has completed the comparison step 210, it moves into step 220, in which it determines the power correction step by dividing the power ratio by a predetermined number of power correction steps within one power correction interval. Because in the preferred embodiment the correction steps are effected at the same time with the downlink closed loop power control adjustment steps, the number of correction steps within one power correction interval equals the number of downlink closed loop power control commands within one power correction interval.

After completing step 220, CSCU 40 moves into step 230, where it compares the calculated correction step with correction step size limits. The correction step size limits are preferably parameters set by the network operator, although those may be calculated for each interval by PCPU 50. If those are calculated by the PCPU, the new values are communicated in the initiation message together with the new target power or the target energy per bit and the optionally adjusted power correction interval. If the correction step is within the limits, the process moves directly into step 240. If not, the current value of the correction step is replaced by the value of the closest limit in step 235 before moving into step 240. In step 240 CSCU 40 informs the power control unit (not shown) of base station 10 of the correction steps. The power control unit of base station 10 subsequently uses the correction steps in combination with closed loop adjustment steps to adjust the base station 10 transmission power according to the downlink closed loop power control commands during the next power correction interval. Now, after the algorithm is started it either converges to the target within power control interval or, if step size limit was applied, at least it performs a correction of number of correction steps within the interval multiplied with the applied limit. The algorithm is started every interval or more often.

Figure 6:
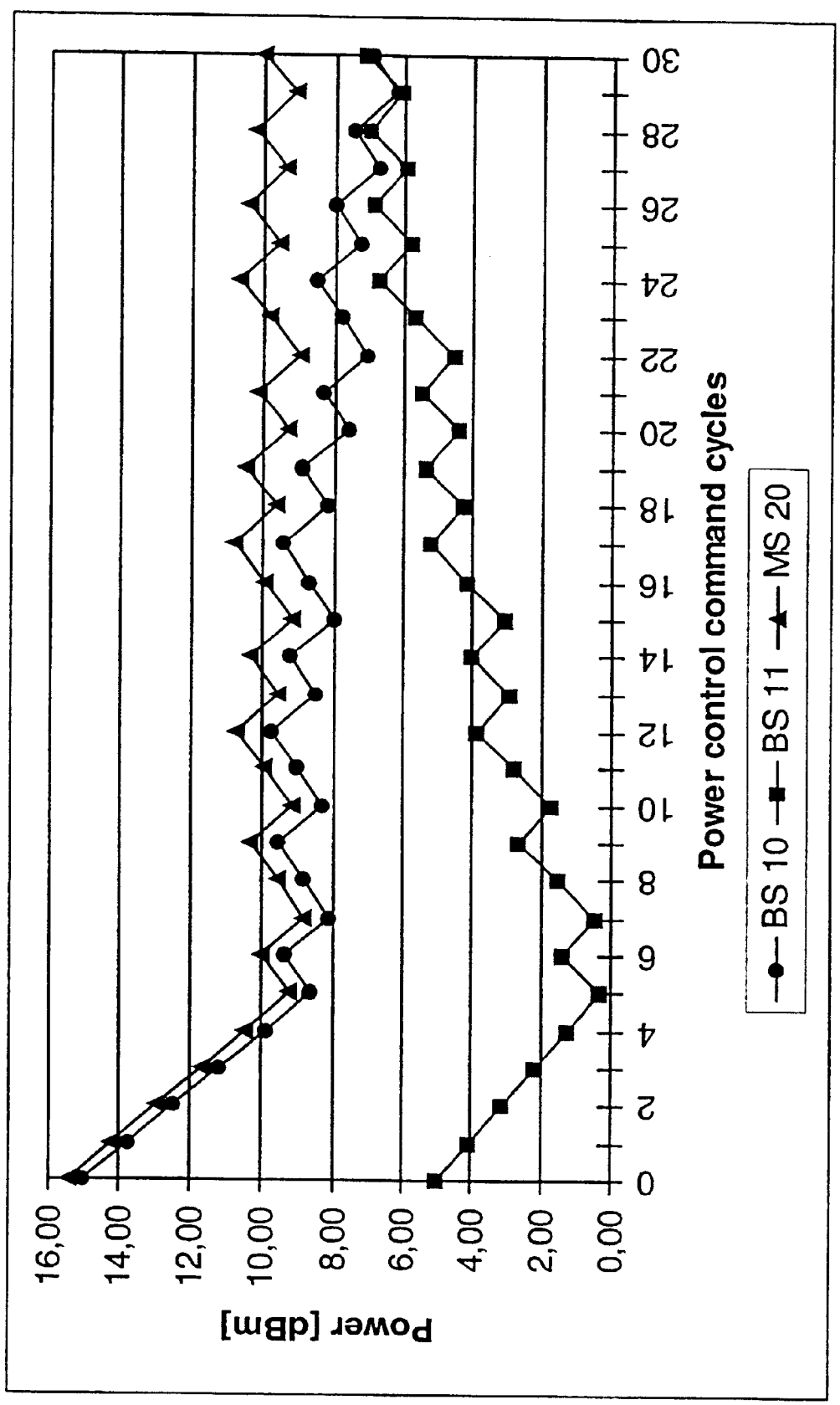
FIG. 6 illustrates the execution of a downlink closed loop power control during one power correction interval with corrected closed loop adjustment steps determined according to the preferred embodiment of the present invention.

FIG. 6 illustrates an example of power control according to the preferred embodiment of the present invention during one power correction interval. In the preferred embodiment, the power correction interval length is set by the network operator to be thirty power control command cycles. For the sake of simplicity, a constant bit rate is assumed. The initial powers of base stations 10 and 11 are 15 dBm and 5 dBm, respectively. At the commencement of a new power correction interval, the PCPU 30, based on mobile measurements, actual transmission power or energy per bit of separate base stations, and possible other data, calculates the target power for both base stations. Because the bit rate is constant, the target power may be used instead of the target energy per bit. The target power, 7 dBm, is transmitted to both base stations in initiation messages. Subsequently the CSCUs in both base stations start to determine the new correction step. In the base station 10, the correction step is (7 dBm−15 dBm)/30=−0,27 dB. Respectively, in base station 11 the correction step is (7 dBm−5 dBm)/30=0,07 dB. Once the correction step in each base station is determined, it is checked against the correction step size limits, −0,5 dB and 0,5 dB. In the preferred embodiment, the limits are set by the network operator. As both correction steps are within the limits, no replacements need to be done. Because the correction steps are used in combination with the closed loop adjustment steps at the same time instants, the effect is the same as by correcting the closed loop adjustment steps by the correction steps. The closed loop adjustment steps, −1 dB and 1 dB, are effectively corrected in CSCU 40 to corrected closed loop adjustment steps of −1,27 dB and 0,73 dB, respectively. In CSCU 41 of base station 11 a corresponding correction process results in the corrected closed loop adjustment steps of −0,93 dB and 1,07 dB. Thus, during the next power correction interval, the base station 10 increases it's power by 0,73 dBs at each "increase power" downlink power control command and decreases it's power by −1,27 at each "decrease power" downlink power control command, whereas the increments and the decrements at the base station 11 are 1,07 dB and −0,93 dB. Because in the preferred embodiment the correction steps are employed independently of closed loop adjustment steps, even at the absence of a closed loop power control command in the case of a sudden uplink fade, the correction step would take place.

As the power correction interval commences, mobile station 20 receives the transmissions with a power of 15 dBm from base station 10 (marked with a circle) and 5 dBm from base station 11 (marked with a square). For the sake of simplicity the downlink attenuation and interference are ignored. The received cumulative power at mobile station 20 is therefore 15,41 dBm (marked with a triangle). Let the downlink power control loop SIR threshold at the mobile station be 10 dBm. Thus mobile station 20 generates and transmits a "decrease power" power control command. This command is received at both base stations and subsequently base station 10 decreases it's power by −1,27 dB and base station 11 by −0,93 dB. Again, the received cumulative power at mobile station 20 is higher than the threshold and it generates and transmits another "decrease power" command. The same continues for five power control commands in a row. Then the received cumulative power has decreased under 10 dBm, and mobile station 20 generates and transmits an "increase power" command. After the sixth power control command the received cumulative power at mobile station 20 begins to zigzag around the threshold 10 dBm. However, the most significant feature in FIG. 5 is that while keeping the received cumulative power at the threshold, the powers of individual base stations converge to their target power value, 7 dBm. At the end of the power correction interval the initial difference of 10 dBs has reduced to an insignificant difference of 0.2 dBs.

The previous description of the preferred embodiment is provided to enable any person skilled in the art to make or use the present invention. The various modifications to this embodiment will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of controlling base station transmission power in a telecommunication system comprising mobile stations and base stations wherein a mobile station simultaneously receives information signals from multiple base stations, characterized in that:

the difference in used power or in used energy per bit between each of said multiple base stations transmitting to said mobile station is reduced by:

determining, for execution of a power correction algorithm, power correction parameters comprising at least a power correction interval, at least one correction step size limit and at least one target power level or at least one target energy level for each of said multiple base stations; and executing said power correction algorithm in each of said multiple base stations in accordance with said determined power correction parameters.

2. A method according to claim 1, characterized in that:

the system further comprises multiple base station controlling elements each connected to base stations under their supervision, and said multiple base stations from which said mobile station simultaneously receives information signals are under control of different base station controlling elements, wherein one of said different base station controlling elements is assigned as a master base station controlling element and said assigned master base station controlling element signals information indicative of at least one of said power correction parameters to others of said different base station controlling elements.

3. A method according to claim 2, characterized in that said information indicative of at least one of said power correction parameters is signalled to said base stations as an initiation message at each power correction interval.

4. A method according to claim 3, characterized in that said initiation message is not sent if the power correction parameters remain unchanged.

5. A method according to claim 2, charcicterized in that said information indicative of at least one of said power correction parameters comprises the target power level or target energy level as said power correction parameter.

6. A method according to claim 1, characterized in that information indicative of said power correction parameters is signalled to said base stations.

7. A method according to claim 1, characterized in that said correction step size limits are maximum increment and maximum decrement.

8. A method according to claim 7, characterized in that the absolute values of said maximum increment and said maximum decrement are equal.

9. A method according to claim 1, characterized in that executing said power correction algorithm comprises comparing the used base station transmission power or energy per bit to said target power or said target energy per bit, respectively.

10. A method according to claim 9, characterized in that the result of said comparison is a power ratio or energy per bit ratio.

11. A method according to claim 10, characterized in that said power ratio or said energy per bit ratio is further divided by a predetermined number of correction steps within said power correction interval to provide said correction step.

12. A method according to claim 11, characterized in that said predetermined number of correction steps equals to the number of downlink closed loop power control adjustment steps within said power correction interval.

13. A method according to claim 11, characterized in that the transmission power or the energy per bit of each of said base stations is corrected by said correction step at predetermined time instants in combination with said downlink closed loop power control adjustment steps.

14. A method according to claim 9, characterized in that the result of said comparison is a power difference or energy per bit difference.

15. A base station system capable of executing a power correction algorithm for converging the power or the energy per bit transmitted by a base station, belonging to said base station system, to a predetermined target value, characterized in that the base station system comprises:

base station receiving means coupled to a network element for receiving from said network element information indicative of power correction algorithm parameters, said power correction algorithm parameters comprising at least a power correction interval, at least one correction step size limit and at least one target power level or at least one target energy level for use during communication with a mobile station, said base station further comprising means for executing said power correction algorithm in accordance with said received information.

16. A base station system according to claim 15, characterized in that the base station system comprises transmitting means for transmitting information indicative of the used power level or of the used energy per bit level.

17. A method of controlling base station transmission power in a telecommunication system comprising a plurality of mobile stations and a plurality of base stations, comprising:

operating a power control processing unit to determine, for execution of a power correction algorithm, power correction parameters comprising at least a power correction interval, at least one correction step size limit and at least one target power level or at least one target energy level for individual ones of said plurality of base stations;

signalling, at least once during a call by a mobile station, determined power correction parameters from the power control processing unit to at least one of said plurality of base stations that is involved in the call with the mobile station; and executing said power correction algorithm in said base station in accordance with said determined power correction parameters signalled from said power control processing unit.

18. A method as in claim 17, where said power control processing unit signals revised power correction parameters to said base station that is involved in the call with the mobile station only upon detecting that a change is required to previously sent power correction parameters.

19. A method as in claim 17, where said base station operates with said mobile station using power control correction steps that are independent of closed loop power control adjustment steps.

\* \* \* \* \*